United States Patent
Kim

(10) Patent No.: US 12,187,360 B2
(45) Date of Patent: Jan. 7, 2025

(54) STEERING CONTROL DEVICE AND STEERING CONTROL METHOD

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 688 days.

(21) Appl. No.: 17/429,619

(22) PCT Filed: Jan. 21, 2020

(86) PCT No.: PCT/KR2020/001002
§ 371 (c)(1),
(2) Date: Aug. 9, 2021

(87) PCT Pub. No.: WO2020/166839
PCT Pub. Date: Aug. 20, 2020

(65) Prior Publication Data
US 2022/0135119 A1    May 5, 2022

(30) Foreign Application Priority Data
Feb. 12, 2019  (KR) .................. 10-2019-0016338

(51) Int. Cl.
B62D 5/04    (2006.01)
(52) U.S. Cl.
CPC ......... *B62D 5/0463* (2013.01); *B62D 5/0487* (2013.01); *B62D 5/0496* (2013.01)
(58) Field of Classification Search
CPC .............................. B62D 5/0463; B60R 16/03
See application file for complete search history.

(56) References Cited

U.S. PATENT DOCUMENTS

| 4,789,040 A | 12/1988 | Morishita et al. |
| 4,977,507 A | 12/1990 | Matsuoka et al. |

(Continued)

FOREIGN PATENT DOCUMENTS

| DE | 689 02 524 | 1/1993 |
| DE | 37 89 033 | 9/1994 |

(Continued)

OTHER PUBLICATIONS

Office Action dated Dec. 7, 2022 for German Patent Application No. 11 2020 000 780.4 and its English machine translation by Google Translate.
International Preliminary Report on Patentability (Chapter I) for PCT/KR2020/001002 issued on Aug. 10, 2021 and its English translation from WIPO (now published as WO2020/166839).

(Continued)

*Primary Examiner* — Long T Tran
(74) *Attorney, Agent, or Firm* — WOMBLE BOND DICKINSON (US) LLP

(57) ABSTRACT

A steering control device and a steering control method are disclosed. Particularly, a steering control device according to the disclosure comprises: a command current calculation unit for calculating a first command current on the basis of detected steering wheel steering information; a resistance calculation unit for calculating internal resistance on the basis of a detected internal temperature; a supply current estimation unit for estimating the supply current of a battery on the basis of an input supply voltage of the battery, the first command current and the internal resistance; and a command current applying unit for comparing the supply current and a preset reference current and, if the supply current is greater than the reference current, changing the first command current to a second command current and applying the second command current to a steering motor.

20 Claims, 8 Drawing Sheets

(56) References Cited

U.S. PATENT DOCUMENTS

| | | | |
|---|---|---|---|
| 10,099,562 B2* | 10/2018 | Jin | G01R 31/382 |
| 10,574,173 B2* | 2/2020 | Nobert | B62D 5/04 |
| 2003/0169001 A1* | 9/2003 | Murakami | B60L 50/16 |
| | | | 318/432 |
| 2005/0067210 A1* | 3/2005 | Hayashi | B62D 6/007 |
| | | | 180/272 |
| 2006/0085113 A1 | 4/2006 | Tamaizumi et al. | |
| 2006/0181819 A1* | 8/2006 | Nomura | B62D 5/0487 |
| | | | 361/31 |
| 2008/0201041 A1* | 8/2008 | Jiang | H02P 21/04 |
| | | | 318/632 |
| 2012/0080259 A1* | 4/2012 | Ueda | H02P 7/281 |
| | | | 318/812 |
| 2013/0124045 A1* | 5/2013 | Suzuki | B62D 7/159 |
| | | | 701/41 |
| 2013/0342148 A1 | 12/2013 | Yanai | |
| 2014/0199569 A1* | 7/2014 | Sisk | B60L 3/0046 |
| | | | 429/90 |
| 2016/0107526 A1* | 4/2016 | Jin | B60L 7/10 |
| | | | 307/10.1 |
| 2019/0047421 A1* | 2/2019 | Jin | B60L 7/10 |
| 2019/0337560 A1* | 11/2019 | Tsubaki | H02P 29/64 |

FOREIGN PATENT DOCUMENTS

| | | |
|---|---|---|
| DE | 10 2005 006 643 | 9/2005 |
| DE | 60 2005 003 753 | 4/2008 |
| JP | 2006-321411 | 11/2006 |
| JP | 2008-296696 | 12/2008 |
| KR | 10-2006-0045218 | 5/2006 |
| KR | 10-2009-0032612 | 4/2009 |
| KR | 10-2015-0033081 | 4/2015 |
| KR | 10-2015-0118821 | 10/2015 |

OTHER PUBLICATIONS

Notice of Allowance dated Nov. 29, 2023 for Korean Patent Application No. 10-2019-0016338 and its English machine translation by Google Translate.

International Search Report for PCT/KR2020/001002 mailed on Apr. 29, 2020 (now published as WO 2020/166839).

Written Opinion of the International Searching Authority for PCT/KR2020/001002 mailed on Apr. 29, 2020 (now published as WO 2020/166839) with English translation provided by Google Translate.

* cited by examiner

STEERING CONTROL DEVICE AND STEERING CONTROL METHOD

CROSS-REFERENCE TO RELATED APPLICATIONS

This application is the national stage of International Application No. PCT/KR2020/001002, filed on Jan. 21, 2020, which claims priority, under 35 U.S.C. 119 (a), to Korean Patent Application No. 10-2019-0016338 filed in the Korean Intellectual Property Office on Feb. 12, 2019, the disclosure of which is incorporated by reference herein in its entirety.

TECHNICAL FIELD

The disclosure relates to a steering control device and a steering control method. Specifically, the disclosure relates to a technique for preventing a device for controlling steering from overheating by limiting the current supplied by a battery.

BACKGROUND ART

To provide steering assistance power to assist the steering of a driving vehicle, technology related to steering assist devices, such as electronic power steering (EPS), is rapidly developing.

EPS basically calculates the command current for driving the motor using information about the steering angle or torque generated by the rotation of the steering wheel and steers the wheels by the output of the motor generated by applying the command current to the motor.

In particular, as the output of the motor increases, the command current applied to the motor should also increase. Further, to apply a larger command current to the motor, the magnitude of the current supplied from the battery also increases.

However, if the magnitude of current supplied from the battery continues to increase, the components or devices included in the EPS may be overheated and may resultantly be damaged.

DETAILED DESCRIPTION OF THE INVENTION

Technical Problem

In light of the background, according to the disclosure, there are provided a steering control device and a steering control method that efficiently use energy by preventing oversupply of the current from the battery.

Technical Solution

To address the foregoing issues, according to an aspect of the disclosure, there is provided a steering control device, comprising a command current calculation unit calculating a first command current based on detected steering information for a steering wheel, a resistance calculation unit calculating an internal resistance based on a detected internal temperature, a supply current estimation unit estimating a supply current of a battery based on the internal resistance, the first command current, and an input supply voltage of the battery, and a command current application unit comparing the supply current with a preset reference current, changing the first command current to a second command current if the supply current is greater than the reference current, and applying the second command current to a steering motor.

According to another aspect of the disclosure, there is provided a steering control method, comprising a command current calculation step calculating a first command current based on detected steering information for a steering wheel, a resistance calculation step calculating an internal resistance based on a detected internal temperature, a supply current estimation step estimating a supply current of a battery based on the internal resistance, the first command current, and an input supply voltage of the battery, and a command current application step comparing the supply current with a preset reference current, changing the first command current to a second command current if the supply current is greater than the reference current, and applying the second command current to a steering motor.

Advantageous Effects

As described above, according to the disclosure, there may be provided a steering control device and a steering control method that efficiently use energy by preventing oversupply of the current from the battery.

MODE FOR CARRYING OUT THE INVENTION

Figure 1:
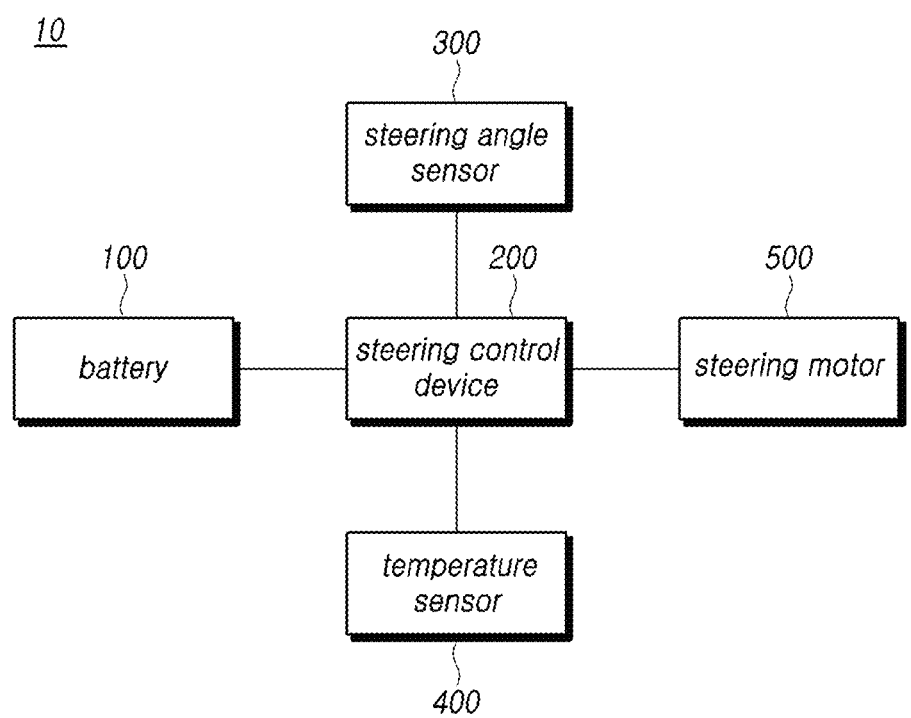
FIG. 1 is a block diagram illustrating a steering control system according to the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a steering control system 10 according to the disclosure.

Referring to FIG. 1, the steering control system 10 according to the disclosure may include a battery 100, a steering control device 200, a steering angle sensor 300, a temperature sensor 400, and a steering motor 500.

The battery 100 supplies a supply current and a supply voltage to each of the components to perform the operation of the steering control system 10.

For example, the battery 100 supplies a supply current and a supply voltage to the steering control device 200.

Here, the supply current and the supply voltage mean the current and voltage applied from the battery, and may be direct current (DC) values.

The steering control device 200 may output a command current to the steering motor 500 to provide a steering assist force for steering of the vehicle. Specifically, if the driver operates a steering wheel (not shown), the steering control device 200 may calculate a command current using steering information for the steering wheel generated by the driver and apply the calculated command current to the steering motor 500.

Here, the command current may mean a current applied to the steering motor 500. The command current may be alternating current (AC), and the AC command current may be represented as an effective value (root mean square (RMS)) or an instantaneous value.

Meanwhile, the steering control device 200 may receive feedback information regarding the output of the steering motor 500.

The steering control device 200 may be implemented as an electronic control device, such as an electronic controller unit (ECU) and, in this case, the ECU may include a micro controller unit (MCU), an inverter, and a printed circuit board (PCB). However, embodiments of the disclosure are not limited thereto.

The steering angle sensor 300 may sense a steering angle generated by rotation of the steering wheel (not shown), generate an electrical signal indicative of steering angle information, and output the electrical signal to the steering control device 200.

The temperature sensor 400 may detect the internal temperature of each component in the steering control system 10 or the internal temperature of the steering control system 10, generate an electrical signal indicative of internal temperature, and output the electrical signal to the steering control device 200.

For example, the temperature sensor 400 detects the internal temperature of the steering control device 200, and inputs internal temperature information to the steering control device 200.

Meanwhile, internal temperatures may be divided into the internal temperature of the steering control device 200 and the internal temperature of the steering motor 500. Here, the internal temperature of the steering motor 500 may be estimated by the internal temperature of the steering control device 200 sensed by the temperature sensor 400.

For example, the internal temperature of the steering motor 500 may be estimated by interacting, at a predetermined ratio, with changes in the internal temperature of the steering control device 200. For example, if the internal temperature of the steering control device 200 rises by one degree, the internal temperature of the steering motor 500 may be estimated as rising by 0.5 degrees or 2 degrees. Here, the interaction ratio between the internal temperature of the steering control device 200 and the internal temperature of the steering motor 500 may be preset to a value determined through an experiment. In determining the interaction ratio, the temperature coefficients, space, and temperature change rate of the elements constituting the steering control device 200 and the steering motor 500 may be considered. In other words, as the interaction ratio between the internal temperature of the steering control device 200 and the internal temperature of the steering motor 500 is preset to a value calculated through an experiment, the characteristics of the steering control system may be reflected.

Although generally used throughout the disclosure for convenience and a better understanding of the description, the term "internal temperature" may mean one or more of the internal temperature of the steering control device 200 and the internal temperature of the steering motor 500 as described above. In other words, according to the disclosure below, when calculating the internal resistance based on the internal temperature and calculating a command current based thereupon, the steering control device 200 alone or the steering motor 500 alone may be considered. Alternatively, internal resistances may be individually calculated considering both the steering control device 200 and the steering motor 500 and may be reflected, according to a preset proportion or degree of influence, in calculating a command current.

The steering motor 500 may receive a command current from the steering control device 200 and may be driven to generate an output corresponding to the command current. Here, the output of the steering motor 500 may mean the steering torque, rotation speed, or a combination thereof.

For example, the steering motor 500 receives a command current and is driven to generate a steering torque and rotation speed corresponding to the command current.

Although not shown, a rack bar is linearly moved by the driving of the steering motor 500, and a knuckle arm and wheels coupled with the rack bar are also steered by the linear motion of the rack bar.

Although not shown, the steering control system 10 according to the disclosure may include a yaw rate sensor, a first torque sensor detecting the reaction torque of a reaction force motor, a second torque sensor detecting the steering torque of the steering motor, and a rotation speed sensor detecting the rotation speed of the steering motor.

The steering control device 200 included in the steering control system 10 according to the disclosure is described below in detail.

Figure 2:
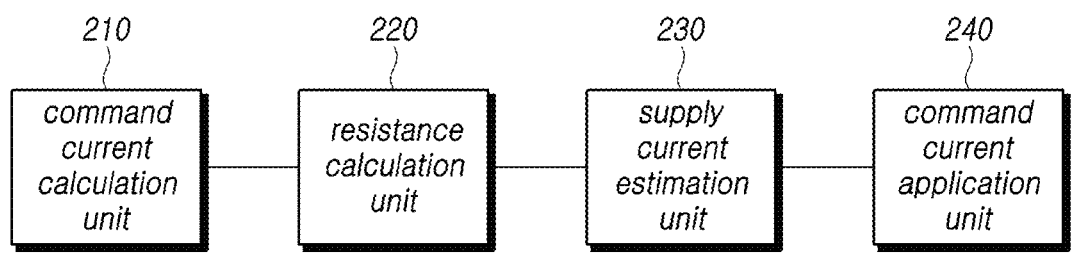
FIG. 2 is a block diagram illustrating a steering control device according to the disclosure.

FIG. 2 is a block diagram illustrating a steering control device 200 according to the disclosure.

Referring to FIG. 2, the steering control device 200 according to the disclosure may include a command current calculation unit 210, a resistance calculation unit 220, a supply current estimation unit 230, and a command current application unit 240.

The command current calculation unit 210 may calculate a first command current based on the detected steering information for the steering wheel.

Here, the steering information for the steering wheel may refer to information regarding a steering angle and torque generated by the driver manipulating the steering wheel.

Here, the first command current may be a current calculated through a preset calculation algorithm using the steering information for the steering wheel. Further, the first command current may be a current applied to the steering motor 500 when the supply current of the battery 100 meets a certain condition.

For example, referring to FIG. 1, the steering angle sensor 300 detects the steering angle generated by the steering wheel and inputs the steering angle information to the steering control device 200. The command current calculation unit 210 calculates the first command current using the received steering wheel steering information.

The resistance calculation unit 220 may calculate the internal resistance based on the detected internal temperature. For example, if the internal temperature increases, the internal resistance may be increased according to, e.g., device characteristics. The increment may be identified by a preset lookup table or may be calculated by a preset calculation formula.

Here, the detected internal temperature may be the internal temperature of the steering control system 10 or the internal temperature of the steering control device 200 as described above. However, embodiments of the disclosure are not limited thereto.

Here, the internal resistance may be the resistance of the steering control system 10, and may mean the resistance of the steering control device 200. The resistance of the steering control system 10 may be used to mean both the internal resistance of the steering control device 200 and the internal resistance of the steering motor 500 as described above.

For example, referring to FIG. 1, the temperature sensor 400 may detect the internal temperature of the steering control device 200 and input the internal temperature information to the steering control device 200. The resistance calculation unit 220 may calculate the internal resistance based on the internal temperature of the steering control device 200.

Meanwhile, the resistance calculation unit 220 may calculate the internal resistance by additionally using a reference temperature and a reference resistance and temperature coefficient corresponding to the reference temperature. If the internal resistance of the steering control device 200 and the internal resistance of the steering motor 500 are individually calculated, different reference resistance, temperature coefficients, and reference temperatures may be set.

Here, the reference temperature may mean a standard temperature, e.g., 25° C., and the reference resistance may mean a resistance at the standard temperature (about 25° C.).

The temperature coefficient may mean the temperature coefficient for a specific material. For example, the temperature coefficient of copper is 3.9 $[10^{-3}/K]$.

In other words, the resistance calculation unit 220 may calculate the internal resistance R through Equation 1 below.

$$R = R_0[1 + \alpha \times (T - T_0)] \qquad \text{[Equation 1]}$$

Here, $R_0$ is the reference resistance, $\alpha$ is the temperature coefficient, T is the detected internal temperature, and $T_0$ is the reference temperature.

Meanwhile, if the internal temperature changes, the resistance calculation unit 220 may update the internal resistance according to the changed internal temperature.

The supply current estimation unit 230 may estimate the supply current of the battery 100 based on the supply voltage of the battery 100, the first command current, and the internal resistance. Specifically, the supply current estimation unit 230 may receive information for the first command current calculated by the command current calculation unit 210, information for the internal resistance calculated by the resistance calculation unit 230, and the supply voltage of the battery 100 and may estimate the supply current of the battery 100 input to the steering control device 200, using the first command current, the supply voltage, and the internal resistance.

Here, the supply current estimation unit 230 may estimate the supply current of the battery 100 using the command current, which has been reduced by a predetermined value from the maximum value of the first command current, instead of the first command current.

Meanwhile, the supply current estimation unit 230 may be fed back with the output of the steering motor 500 and may estimate the supply current by reflecting the output of the steering motor 500. Specifically, the supply current estimation unit 230 may receive the feedback of the output of the steering motor 500 and then estimate the supply current ($I_{Batt}$) through Equation 2 below.

$$I_{Batt} = \frac{V_{Batt} - \sqrt{V_{Batt}^2 - 4R \times (P_{output} + R \times I_{Motor}^2)}}{2R} \qquad \text{[Equation 2]}$$

Here, $V_{Batt}$ is the supply voltage of the battery 100, R is the internal resistance, $P_{output}$ is the output of the steering motor 500, and $I_{Motor}$ is the command current.

Meanwhile, if the command current is applied to the steering motor 500, the supply current estimation unit 230 may be fed back with the command current applied to the steering motor 500. If the command current is fed back, the supply current estimation unit 230 may re-estimate the supply current by reflecting the fed-back command current.

The command current application unit 240 may compare the magnitude of the supply current of the battery 100 with the magnitude of a preset reference current and, according to the result of comparison, may change the magnitude of the first command current.

Specifically, the command current application unit 240 may compare the supply current with the reference current and, if the supply current is greater than the reference current, change the first command current to a second command current, and apply the second command current to the steering motor 500.

Here, the reference current means a current for preventing the internal temperature of the steering control device 200 from excessively increasing, and may be a direct current (DC) like the supply current. Such a reference current may be designed by an experimental result, an algorithm, or the like.

Here, the second command current is a current reduced by a predetermined value from the maximum value of the first command current, and may mean a current applied to the steering motor 500.

In this case, if the first command current is changed to the second command current, the supply current estimation unit 230 may estimate the supply current by reflecting the second command current instead of the first command current.

Meanwhile, the command current application unit 240 may apply not only the command current but also the command voltage to the steering motor 500.

A steering control method by the steering control device 200 according to the disclosure is described below in detail.

Figure 3:
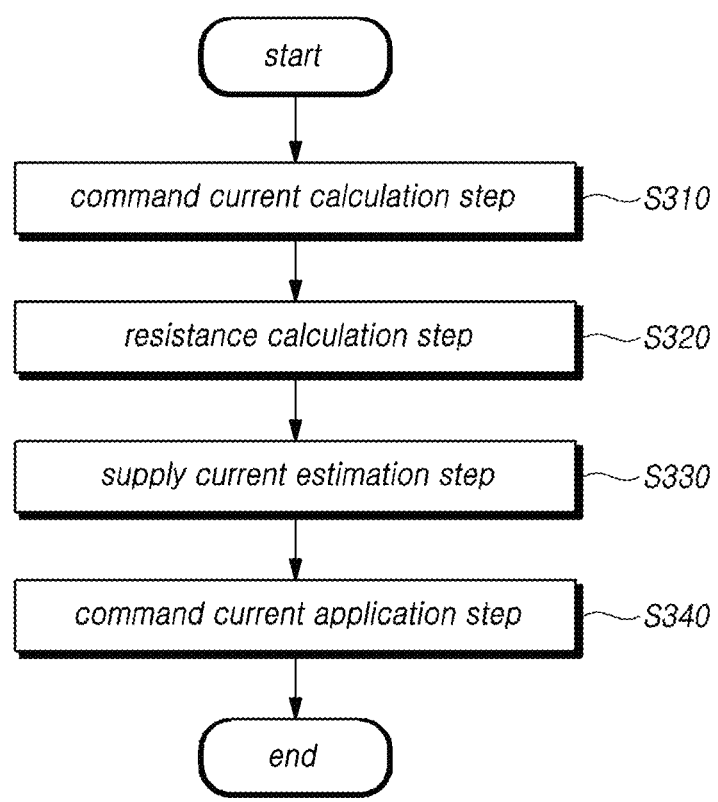
FIG. 3 is a flowchart illustrating a steering control method according to the disclosure.

FIG. 3 is a flowchart illustrating a steering control method according to the disclosure.

Referring to FIG. 3, a command current calculation step S310 calculates a first command current based on steering information for the steering wheel detected by the steering angle sensor 300.

For example, the command current calculation unit 210 calculates the first command current using steering angle information for the steering angle of the steering wheel detected by the steering angle sensor 300.

Next, a resistance calculation step S320 calculates the internal resistance based on the internal temperature detected by the temperature sensor 400.

For example, the resistance calculation unit 220 previously sets a reference temperature and a reference resistance corresponding to the reference temperature and calculates the internal resistance using a difference value between the internal temperature and the reference temperature and the reference resistance.

In another example, the resistance calculation unit 220 determines a correction value by reflecting a preset temperature coefficient and a difference value between the internal temperature and the reference temperature to the reference resistance, and calculates the internal resistance by adding the correction value to the reference resistance.

The supply current estimation step S330 estimates the supply current of the battery 100 based on the supply voltage of the battery 100, the command current, and the internal resistance.

For example, the supply current estimation unit 230 receives information for the internal resistance and the supply voltage of the battery 100, is fed back with the output of the steering motor 500, and receives the calculated first command current or is fed back with the first command current or second command current applied to the steering motor 500. Further, the supply current estimation unit 230 estimates the supply current using the internal resistance, the supply voltage of the battery 100, and the output and the command current of the steering motor 500.

A command current application step S340 compares the supply current with a preset reference current and, according to the result of comparison, applies the first command current to the steering motor 500 or converts the first command current into a second command current and applies the second command current to the steering motor 500.

For example, the command current application unit 240 applies the first command current to the steering motor 500 if the supply current is equal to or less than the reference current.

As another example, if the supply current is greater than the reference current, the command current application unit 240 applies the second command current to the steering motor 500.

Here, the magnitude of the second command current may be smaller than the magnitude of the first command current. As a specific example, if the command current is represented as an effective value, the effective value of the second command current is smaller than the effective value of the first command current. If the command current is represented as an instantaneous value, the maximum value (or peak value) of the second command current is smaller than the maximum value of the first command current.

As described above, the steering control device 200 according to the disclosure may prevent the internal temperature of the steering control device 200 from excessively increasing by limiting the current of the battery 100 to a certain level.

Meanwhile, it is needed to change to an appropriate command current value depending on the estimated supply current and apply it to the steering motor 500 so as to allow the steering control device 200 to efficiently control the steering motor 500 while preventing the internal temperature from excessively increasing.

Embodiments of changing the command current according to the estimated supply current is described below in detail, according to the disclosure.

Figure 4:
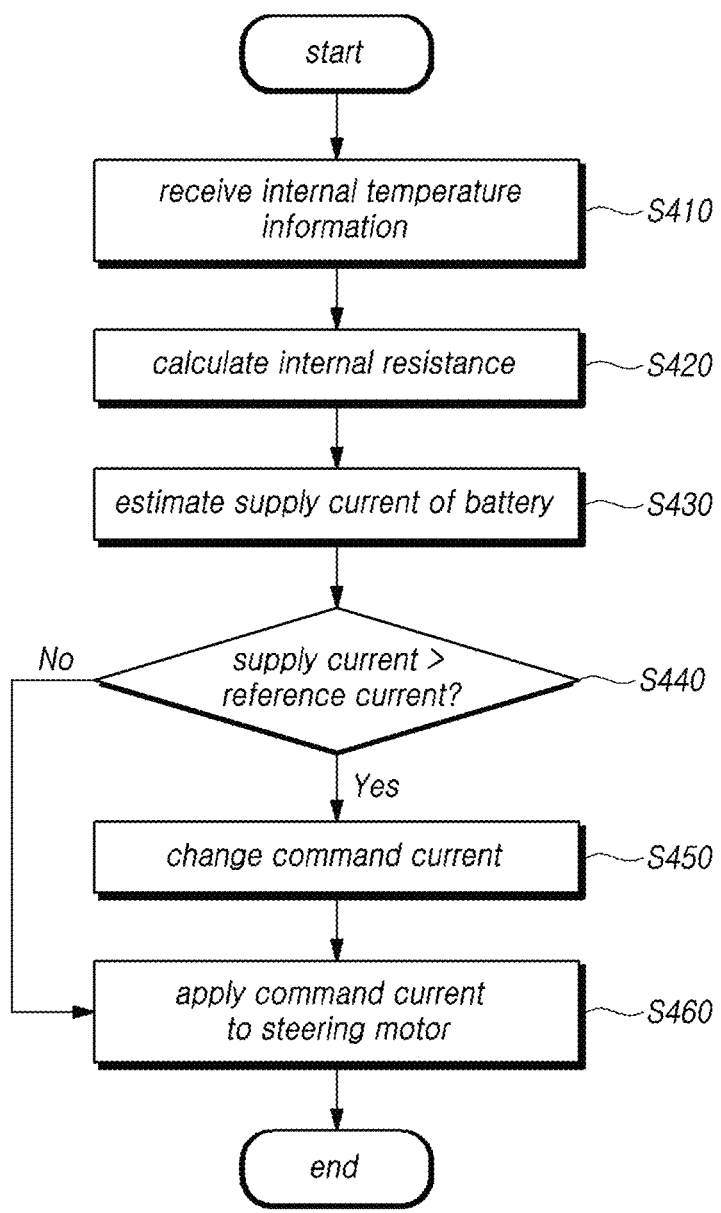
FIG. 4 is a flowchart illustrating an embodiment of changing a command current according to the disclosure.

FIG. 4 is a flowchart illustrating an embodiment of changing a command current according to the disclosure.

Referring to FIG. 4, in step S410, internal temperature information for the internal temperature of the steering control device 200 is received and, in step S420, the internal resistance is calculated using the received internal temperature information.

For example, the resistance calculation unit 220 previously sets a reference resistance, a reference temperature, and a temperature coefficient, receives the internal temperature information generated by the temperature sensor 400, and calculates the internal resistance by applying the reference resistance, reference temperature, temperature coefficient, and internal temperature to Equation 1.

In step S430, the supply current of the battery 100 is estimated using the internal resistance and the supply voltage of the battery 100.

For example, the supply current estimation unit 240 receives the supply voltage of the battery 100, and the output and the command current of the steering motor 500, and estimates the supply current using the internal resistance, the supply voltage of the battery 100, and the output and command current of the steering motor 500.

As another example, the supply current estimation unit 230 estimates the supply current of the battery 100 by applying the internal resistance, the supply voltage of the battery 100, and the output and first command current of the steering motor 500 to Equation 2.

In step S440, the magnitude of the estimated supply current is compared with the magnitude of a preset reference current.

If the magnitude of the supply current is equal to or less than the magnitude of the reference current, the calculated command current is applied to the steering motor 500 without change, in step S460. For example, the command current application unit 240 applies the first command current to the steering motor 500 if the supply current is equal to or less than the reference current.

If the magnitude of the supply current is greater than the magnitude of the reference current, the command current is changed in step S450 and, in the next step S460, the changed command current is applied to the steering motor 500. For example, if the supply current is greater than the reference current, the command current application unit 240 changes the first command current to the second command current so that the maximum value of the second command current is smaller than the maximum value of the first command current. Next, the command current application unit 240 applies the second command current to the steering motor 500.

As described above, the steering control device 200 according to the disclosure may predict whether the supply current of the battery 100 is excessively supplied, reduce the command current and apply it to the steering motor 500, thereby preventing overheating.

Figure 5:
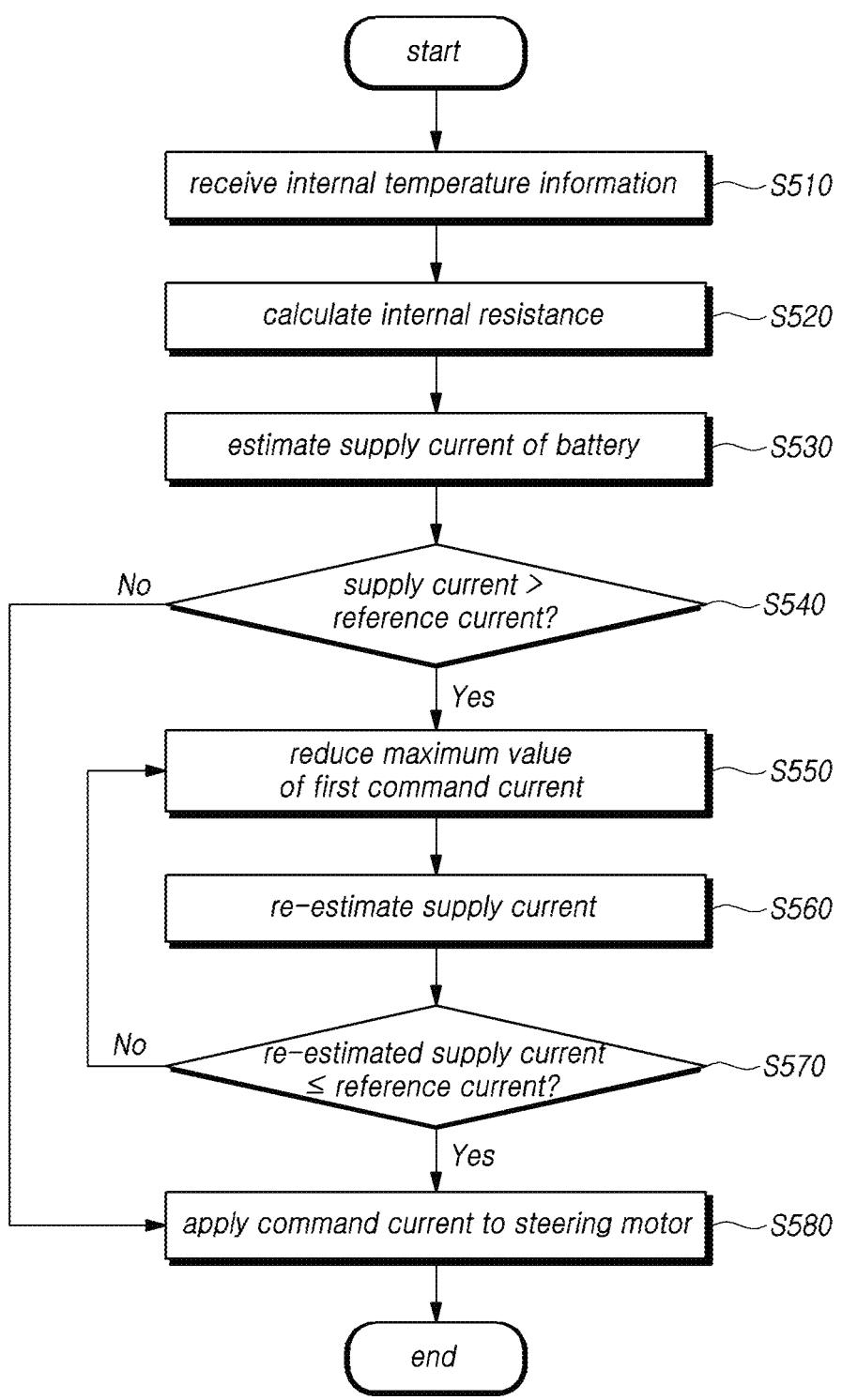
FIG. 5 is a flowchart illustrating another embodiment of changing a command current according to the disclosure.

FIG. 5 is a flowchart illustrating another embodiment of changing a command current according to the disclosure.

Referring to FIG. 5, steps S510 to S540 are the same as those described above with reference to FIG. 4 and are thus skipped.

If the magnitude of the supply current is equal to or less than the magnitude of the reference current, the calculated command current is applied to the steering motor 500 without change, in step S580.

If the magnitude of the supply current is greater than the magnitude of the reference current, the maximum value of the first command current is decreased in step S550. For example, the command current application unit 240 subtracts a preset decrement from the maximum value of the calculated first command current. Further, the command current application unit 240 may recognize the command current obtained by subtracting the aforementioned decrement from the maximum value of the first command current, as the second command current.

Then, in step S560, the supply current of the battery 100 reflecting the reduced first command current is re-estimated. For example, in a case where the second command current is a current reduced by a certain value from the maximum value of the first command current, if the first command current is changed to the second command current, the supply current estimation unit 230 re-estimates the supply current by reflecting the second command current.

In step S570, the re-estimated supply current and the reference current are compared again. If the re-estimated supply current is still greater than the reference current, the reduced maximum value of the first command current is further reduced (S550), and the supply current is re-estimated by reflecting the further reduced first command current (S560). The re-estimated supply current and the reference current are compared (S570).

In other words, a first process for reducing the maximum value of the first supply current until the supply current meets being equal to or less than the reference current, and a second process for re-comparing the re-estimated supply current with the reference current are repeatedly performed.

For example, if the supply current is greater than the reference current, the command current application unit 240 repeats the first process for reducing the maximum value of the first command current by a preset value and the second process for re-comparing the reference current with the supply current re-estimated based on the reduced command current until the supply current meets being equal to or less than the reference current.

If the re-estimated supply current is equal to or less than the reference current, a second command current corresponding to the re-estimated supply current is applied to the steering motor 500 in step S580.

For example, if the re-estimated supply current meets being equal to or less than the reference current, the command current application unit 240 applies the second command current corresponding to the re-estimated supply current to the steering motor 500.

As described above, the steering control device 200 according to the disclosure may prevent the command current to be finally applied to the steering motor 500 from being excessively reduced.

Figure 6:
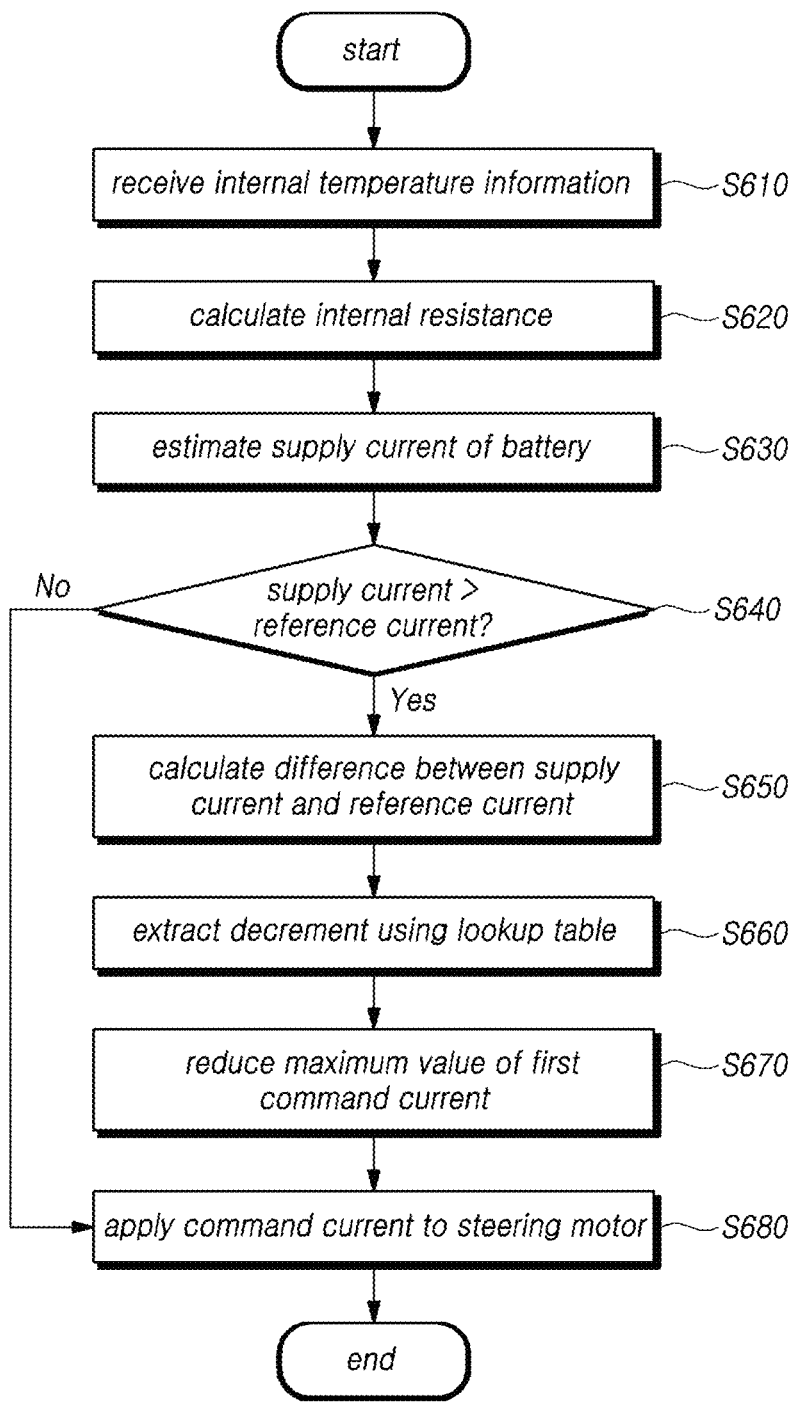
FIG. 6 is a flowchart illustrating still another embodiment of changing a command current according to the disclosure.

FIG. 6 is a flowchart illustrating still another embodiment of changing a command current according to the disclosure.

Referring to FIG. 6, steps S610 to S640 are the same as those described above with reference to FIG. 4 and are thus skipped.

If the magnitude of the supply current is greater than the magnitude of the reference current, a difference between the supply current and the reference current is calculated in step S650. Specifically, in step S650, a value obtained by subtracting the magnitude of the reference current from the magnitude of the supply current is calculated.

Next, to extract a decrement to be subtracted from the maximum value of the first command current, a decrement corresponding to the difference calculated in step S650 is extracted using a preset and stored lookup table in step S660.

Here, the lookup table may mean a table that summarizes decrements of the command current depending on differences between supply currents and reference currents. The lookup table may be previously designed by, e.g., an algorithm or experiment.

In step S670, the maximum value of the first command current is decreased. In other words, in step S670, the extracted decrement is subtracted from the maximum value of the first command current.

For example, if the supply current is greater than the reference current, the command current application unit 240 calculates a difference between the supply current and the reference current, extracts the decrement corresponding to the difference based on the preset lookup table, and changes into the second command current which has been reduced by the extracted decrement from the maximum value of the first command current.

Next, in step S680, the second command current is applied to the steering motor 500.

Although not shown, as illustrated in FIG. 5, the supply current may be re-estimated by reflecting the reduced first command current after step S670.

As described above, the steering control device 200 according to the disclosure may adjust the command current more efficiently and quickly using a pre-designed lookup table.

Described below are graphs for the relationship between the steering torque and the rotation speed of the steering motor 500 or the supply current of the battery 100 for the rotation speed of the steering motor 500 when the command current is adjusted according to the disclosure.

Figure 7:
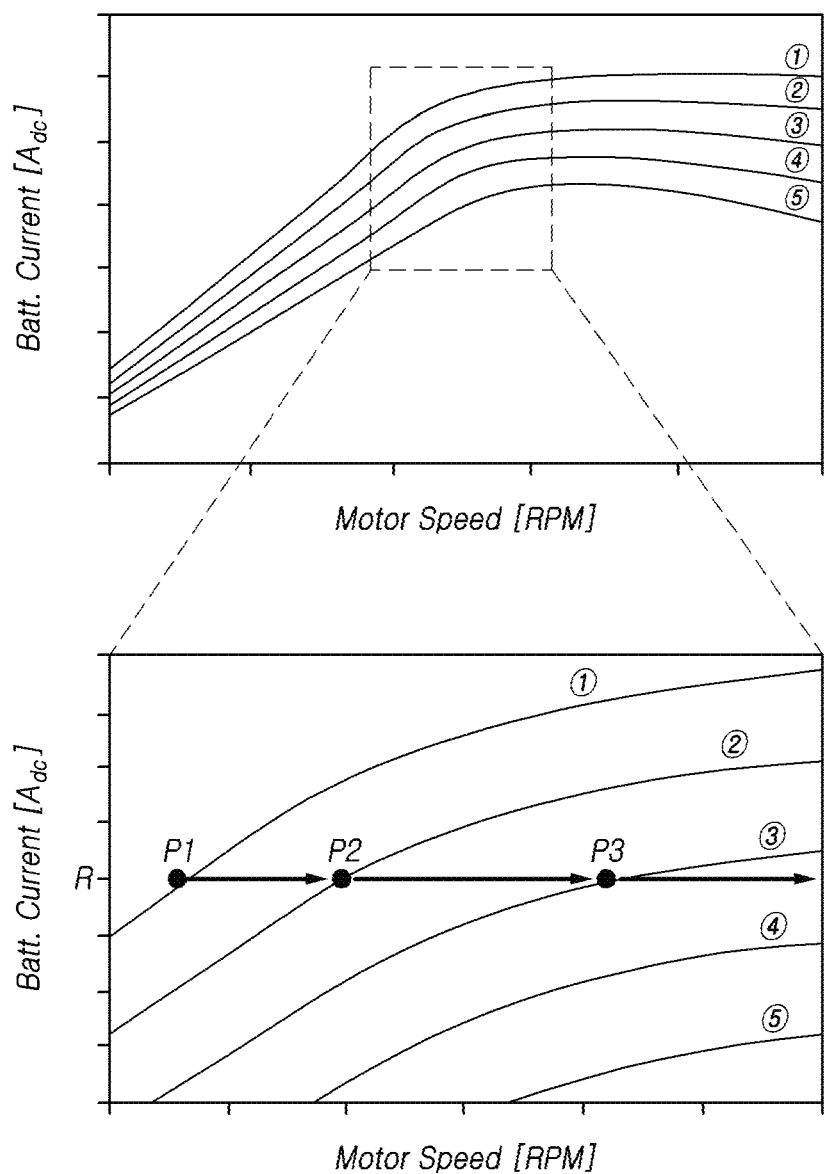
FIG. 7 is a graph schematically illustrating a relationship between the rotation speed of a steering motor and the current supplied from a battery, for each command current, according to the disclosure.

FIG. 7 is a graph schematically illustrating a relationship between the rotation speed of a steering motor 500 and the current supplied from a battery 100, for each command current, according to the disclosure.

Referring to FIG. 7, in a case where a specific command current is applied to the steering motor 500, if the rotation speed of the steering motor 500 increases, the supply current of the battery 100 typically increases as well. In other words, a larger supply current is required to implement a larger rotation speed of the steering motor 500.

On the other hand, if the rotation speed of the steering motor 500 remains the same, as the maximum value of the command current applied to the steering motor 500 increases, the supply current of the battery 100 also increases. In other words, if the maximum value of the command current increases, a larger supply current is required.

Accordingly, among a first graph ① to a fifth graph ⑤, the graph corresponding to the largest maximum value of the command current is the first graph ①, and the graph corresponding to the smallest maximum value of the command current is the fifth graph ⑤.

In a case where the steering control device 200 according to the disclosure applies the command current according to the first graph ① to the steering motor 500, if the rotation speed of the steering motor 500 is increased by the steering control device 200, the required supply current of the battery 100 also increases according to the first graph ①.

In this case, if the supply current of the battery 100 is greater than the reference current R, the internal temperature of the steering control device 200 may be excessively increased and the steering control device 200 may resultantly be damaged.

Accordingly, if it is expected that the supply current of the battery 100 gradually increases to a first point P1 as the rotation speed of the steering motor 500 increases, the steering control device 200 according to the disclosure reduces the maximum value of the command current. In other words, the steering control device 200 according to the disclosure applies the command current according to the second graph ②, instead of the command current according to the first graph ①.

Similarly, in a case where the steering control device 200 according to the disclosure applies the command current according to the second graph ② to the steering motor 500, if the supply current of the battery 100 is expected to gradually increase to a second point P2, the steering control device 200 according to the disclosure applies the command current according to the third graph ③, instead of the command current according to the second graph ②.

The first graph ① to the fifth graph ⑤ are mere examples for ease of description, and there may preferably be a myriad of graphs.

Figure 8:
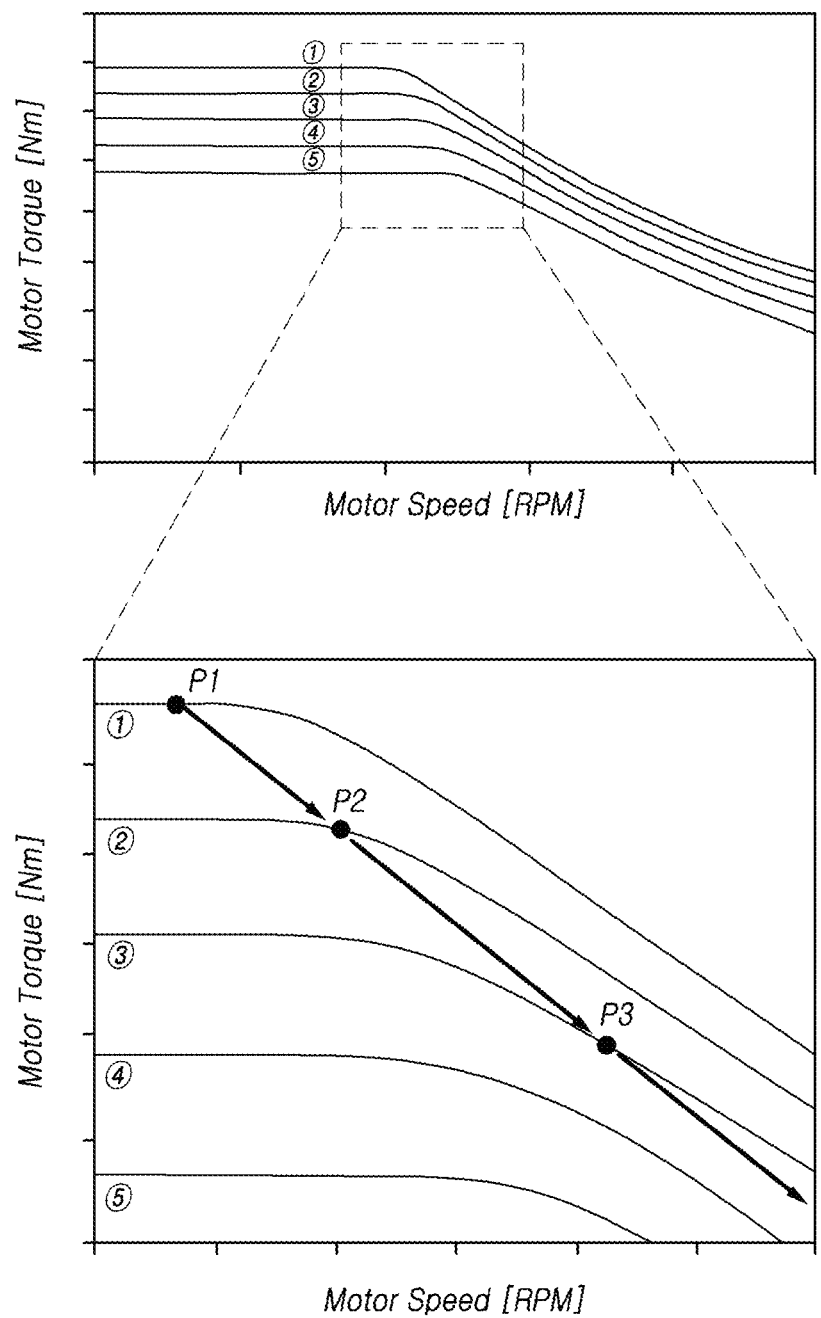
FIG. 8 is a graph schematically illustrating a relationship between the rotation speed of a steering motor and steering torque, for each command current, according to the disclosure.

FIG. 8 is a graph schematically illustrating a relationship between the rotation speed of a steering motor and steering torque, for each command current, according to the disclosure.

Referring to FIG. 8, similar to what is shown in FIG. 7, among a first graph ① to a fifth graph ⑤, the graph corresponding to the largest maximum value of the command current is the first graph ①, and the graph corresponding to the smallest maximum value of the command current is the fifth graph ⑤.

In a case where the steering control device 200 according to the disclosure applies the command current according to the first graph ① to the steering motor 500, if the rotation speed of the steering motor 500 increases and reaches a first point P1, the steering control device 200 according to the disclosure applies the command current according to the second graph ②, instead of the command current according to the first graph ①.

Similarly, if the rotation speed of the steering motor 500 increases and reaches a second point P2, the steering control device 200 according to the disclosure applies the command current according to the third graph ③, instead of the second graph ②.

As described above, even when the steering torque of the steering motor 500 is slightly reduced as the rotation speed of the steering motor 500 increases, the disclosure may prevent damage to the steering control device 200, providing stable steering assist force.

As described above, according to the disclosure, there may be provided a steering control device and steering control method that efficiently use energy by preventing oversupply of the current from the battery.

Further, according to the disclosure, there may be provided a steering control device and steering control method that may prevent damage to the control device due to overheating and provide the driver with driving stability.

Further, according to the disclosure, there may be provided a steering control device and steering control method that may stably provide steering assist force by minimizing reductions in steering torque.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

10: steering control system 100: battery
200: steering control device 210: command current calculation unit
220: resistance calculation unit 230: supply current estimation unit
240: command current application unit 300: steering angle sensor
400: temperature sensor 500: steering motor

CROSS-REFERENCE TO RELATED APPLICATION

This application claims priority, under 35 U.S.C. 119(a), to Korean Patent Application No. 10-2019-0016338 filed in the Korean Intellectual Property Office on Feb. 12, 2019, the disclosure of which is incorporated by reference herein in its entirety.

The invention claimed is:
1. A steering control device, comprising:
a command current calculation unit calculating a first command current based on detected steering information for a steering wheel;
a resistance calculation unit calculating an internal resistance based on a detected internal temperature;

a supply current estimation unit estimating a supply current of a battery based on the internal resistance, the first command current, and an input supply voltage of the battery; and a command current application unit comparing the supply current with a preset reference current, changing the first command current to a second command current if the supply current is greater than the reference current, and applying the second command current to a steering motor.

2. The steering control device of claim 1, wherein the resistance calculation unit previously sets a reference temperature and a reference resistance corresponding to the reference temperature and calculates the internal resistance using the reference resistance and a difference between the internal temperature and the reference temperature.

3. The steering control device of claim 2, wherein the resistance calculation unit determines a correction value by reflecting the difference and a preset temperature coefficient to the reference resistance and calculates the internal resistance by adding the correction value to the reference resistance.

4. The steering control device of claim 2, wherein the internal temperature is divided into an internal temperature of the steering control device and an internal temperature of the steering motor, and wherein the internal resistance is divided into a resistance of an element constituting the steering control device and a resistance of a winding of the steering motor.

5. The steering control device of claim 4, wherein the reference temperature and the reference resistance are separately set for each of the steering control device and the steering motor, and wherein the internal temperature of the steering motor is estimated based on the internal temperature of the steering control device.

6. The steering control device of claim 1, wherein the internal resistance increases as the internal temperature increases.

7. The steering control device of claim 1, wherein the supply current estimation unit is fed back with an output of the steering motor and estimates the supply current by reflecting the output of the steering motor.

8. The steering control device of claim 1, wherein if the first command current is changed to the second command current, the supply current estimation unit re-estimates the supply current by reflecting the second command current instead of the first command current.

9. The steering control device of claim 1, wherein the command current application unit repeats a first process for reducing a maximum value of the first command current by a preset decrement and a second process for re-comparing a supply current re-estimated based on the reduced command current with the reference current if the supply current is greater than the reference current, and if the re-estimated supply current meets being equal to or less than the reference current, applies a second command current corresponding to the re-estimated supply current to the steering motor.

10. The steering control device of claim 1, wherein the command current application unit, calculates the difference between the supply current and the reference current if the supply current is greater than the reference current, extracts a decrement corresponding to the difference based on a preset lookup table, and changes to the second command current reduced by the extracted decrement from a maximum value of the first command current.

11. The steering control device of claim 1, wherein the command current application unit applies the first command current to the steering motor if the supply current is equal to or less than the reference current.

12. A steering control method, comprising:

a command current calculation step calculating a first command current based on detected steering information for a steering wheel;

a resistance calculation step calculating an internal resistance based on a detected internal temperature;

a supply current estimation step estimating a supply current of a battery based on the internal resistance, the first command current, and an input supply voltage of the battery; and a command current application step comparing the supply current with a preset reference current, changing the first command current to a second command current if the supply current is greater than the reference current, and applying the second command current to a steering motor.

13. The steering control method of claim 12, wherein the resistance calculation step previously sets a reference temperature and a reference resistance corresponding to the reference temperature and calculates the internal resistance using the reference resistance and a difference between the internal temperature and the reference temperature.

14. The steering control method of claim 13, wherein the resistance calculation step determines a correction value by reflecting the difference and a preset temperature coefficient to the reference resistance and calculates the internal resistance by adding the correction value to the reference resistance.

15. The steering control method of claim 13, wherein the internal temperature is divided into an internal temperature of the steering control device and an internal temperature of the steering motor, and wherein the internal resistance is divided into a resistance of an element constituting the steering control device and a resistance of a winding of the steering motor.

16. The steering control method of claim 15, wherein the reference temperature and the reference resistance are separately set for each of the steering control device and the steering motor, and wherein the internal temperature of the steering motor is estimated based on the internal temperature of the steering control device.

17. The steering control method of claim 12, wherein the supply current estimation step is fed back with an output of the steering motor and estimates the supply current by reflecting the output of the steering motor.

18. The steering control method of claim 12, wherein the command current application step repeats a first process for reducing a maximum value of the first command current by a preset decrement and a second process for re-comparing a supply current re-estimated based on the reduced command current with the reference current if the supply current is greater than the reference current, and if the re-estimated supply current meets being equal to or less than the reference current, applies a second command current corresponding to the re-estimated supply current to the steering motor.

19. The steering control method of claim 12, wherein the command current application step, calculates the difference between the supply current and the reference current if the supply current is greater than the reference current, extracts a decrement corresponding to the difference from a preset decrement table, and changes to the second command current reduced by the extracted decrement from a maximum value of the first command current.

20. The steering control method of claim 12, wherein the command current application step applies the first command current to the steering motor if the supply current is equal to or less than the reference current.

\* \* \* \* \*